Patented Oct. 22, 1940

2,218,566

UNITED STATES PATENT OFFICE 2,218,566

STABILIZATION OF CELLULOSE ETHERS

Elwood V. White, Moscow, Idaho, assignor to The Dow Chemical Company, Midland, Mich., a corporation of Michigan No Drawing. Application September 13, 1939, Serial No. 294,677

4 Claims. (Cl. 260—232)

This invention relates to a method for the stabilization of cellulose ethers and particularly to such a method whereby the said ethers may be made resistant to thermo-decomposition and/or decomposition due to the effects of ultraviolet light.

Cellulose ethers are ordinarily prepared by the interaction of an alkyl halide, an alkyl sulfate or an aralkyl halide and alkali cellulose. The resulting product when first prepared contains compounds other than the cellulose ether. Many such preparations are not sufficiently stable at temperatures normally met with in thermoplastic applications of the cellulose ether and are injuriously affected by the action of light. Many of the bodies promoting reduced stability at elevated temperatures are of an aldehydic nature as a result of partial oxidation of the etherified cellulose molecule. Others are non-cellulosic acids or aldehydes resulting from degradation of the cellulose molecule, and include such compounds as lactic acid, formic acid, uronic acid, and the like, which may not be completely removed by the methods of purification applied to the cellulose ether. When either of these types of compounds are present, it is impossible to predict or to control the extent of their effect upon the stability of the cellulose ether.

Cellulose ethers having insufficient resistance to degradation at elevated temperatures are characterized by a gradual decrease in their intrinsic viscosity when subjected to the action of heat and/or light. One common test to indicate the degree of stability of a cellulose ether comprises heating a film of the ether to a temperature of 120° C. for 16 hours, thereafter dissolving the so-treated film to form a standard solution, and comparing the viscosity of said solution with that of a similar solution of the original cellulose ether. The percentage of the original viscosity which is retained by the heated ether is referred to as the stability, expressed in per cent.

It is accordingly among the objects of the present invention to provide a method whereby there may be removed those extraneous impurities present in cellulose ethers which tend to impair the thermostability thereof. It is another object of the invention to provide a method whereby the thermostability of cellulose ethers may be increased. Other objects and advantages of the invention will become apparent from the following description.

It has now been found that crude or partially purified cellulose ethers may be made highly resistant to the degrading effect of elevated temperatures and/or of light by subjecting the said ether, while in solution, to the action of relatively small quantities of diazo-methane. According to the invention, the process is carried out by dissolving diazo-methane in a suitable non-reducible solvent therefor, such as alcohol or ether. An amount of this solution is added to a solution of the cellulose ether in a non-reducible solvent in such proportions that the weight of diazo-methane is between 0.5 and 2 per cent, and suitably from 0.5 to 1 per cent of the weight of cellulose ether. The so-formed mixture is stirred at room temperature and allowed to stand until the initial coloration due to the diazo-methane has disappeared from solution. During the reaction some of the diazo-methane decomposes, and forms polymeric by-products which should be removed from the treated solution suitably by filtration, prior to the isolation of the purified cellulose ether. Unused diazo-methane may be removed or destroyed by heating, by acid treatment, or by vacuum treatment.

The following examples illustrate the practice of the present invention:

Example 1

A 20 per cent solution of ethyl cellulose was prepared in a solvent consisting of 80 parts of toluene and 20 parts of ethanol by volume. One portion of this solution, weighing 100 grams, was treated with 25 cc. of an ethereal solution of diazo-methane containing about 0.3 gram of the latter reagent (1.5 per cent based on ethyl cellulose). At first the resulting solution had a yellowish color which gradually disappeared as the reaction progressed. After the reaction was complete, as evidence by the disappearance of the yellow color, excess diazo-methane was removed by gently warming the solution while under subatmospheric pressure. Subsequently, insoluble diazo-methane decomposition products were removed from the solution by filtration and the resulting solution was poured out upon a flat surface, the solvent evaporated, and the resulting foil was subjected to a stability test. The foil was air-dried and subsequently dried in a steam-heated oven for one-half hour. A sample was cut from the film and heated at 120° C. for 16 hours. A 2 per cent solution of the heated film was thereafter prepared in a solvent consisting of 67 parts of benzene and 33 parts of methanol by volume. The purified product was found to have a stability of 98 per cent of that of the unheated product. A film was cast from the untreated portion of the original ethyl cellulose solution.

This was subjected to the stability test in a manner similar to that just described and had a stability of 75 per cent. The diazo-methane treatment therefore improved the stability of the product by about one-third.

*Example 2*

In a manner similar to that described in the preceding example an ethyl cellulose, whose films exhibited a stability of only 45 percent, was subjected to diazo-methane treatment, and after such treatment had a stability of 96 per cent. Another sample of 45 per cent stability was improved to a value of over 90 per cent stability, using about 0.5 per cent of diazo-methane.

The foregoing examples illustrate the applicability of the present process to the stabilization of ethyl cellulose. Similar results are obtained when other of the lower alkyl, water-insoluble ethers of cellulose are treated in a like manner. Examples of such materials are ethyl, propyl, butyl, and amyl celluloses and the mixed ethers comprising these substituent groups.

The solvents employed in the experiments recorded in the examples comprised alcohol and aromatic hydrocarbons such as toluene or benzene. Other solvents which may be employed in like manner are the chlorinated aliphatic hydrocarbons such as carbon tetrachloride, chloroform, ethylene chloride, and the like, or mixtures of such materials with other nonreducible solvents for the cellulose ethers. Solvents which cannot be used in the process include acetone and like materials containing a ketone or aldehyde group.

In no instance has it been found necessary to employ much more than 2 per cent of diazo-methane, based on the weight of the cellulose ether being treated, and in most cases from 0.5 to 1 per cent of this reagent has been sufficient for the desired purpose.

Other modes of applying the principle of my invention may be employed instead of that explained, change being made as regards the process herein disclosed, provided the step or steps stated by any of the following claims or the equivalent of such stated step or steps be employed.

I therefore particularly point out and distinctly claim as my invention:

1. In a process for stabilizing cellulose ethers against thermal decomposition, the step which consists in treating a solution of the cellulose ether in an inert solvent with diazo-methane.

2. In a process for stabilizing a lower alkyl ether of cellulose against thermal decomposition, the steps which consist in treating a solution of the said cellulose ether in an inert solvent with a relatively small amount of diazo-methane and, after the reaction is complete, removing excess diazo-methane and recovering the so-treated cellulose ether.

3. The process of purifying ethyl cellulose, to improve its thermostability, which comprises treating a solution thereof in an inert solvent with an amount of diazo-methane in the range from 0.5 to 2 per cent of the weight of ethyl cellulose present, removing excess diazo-methane after the reaction is complete, and recovering the so-treated ethyl cellulose.

4. The process as claimed in claim 3, wherein the recovered ethyl cellulose retains at least 90 per cent of its intrinsic viscosity when subjected to the 120° C.-16 hour test.

ELWOOD V. WHITE.